Aug. 16, 1966 J. A. SWANSON 3,267,428
MAGNETIC CORE COMPARATOR SYSTEM
Filed Dec. 14, 1962
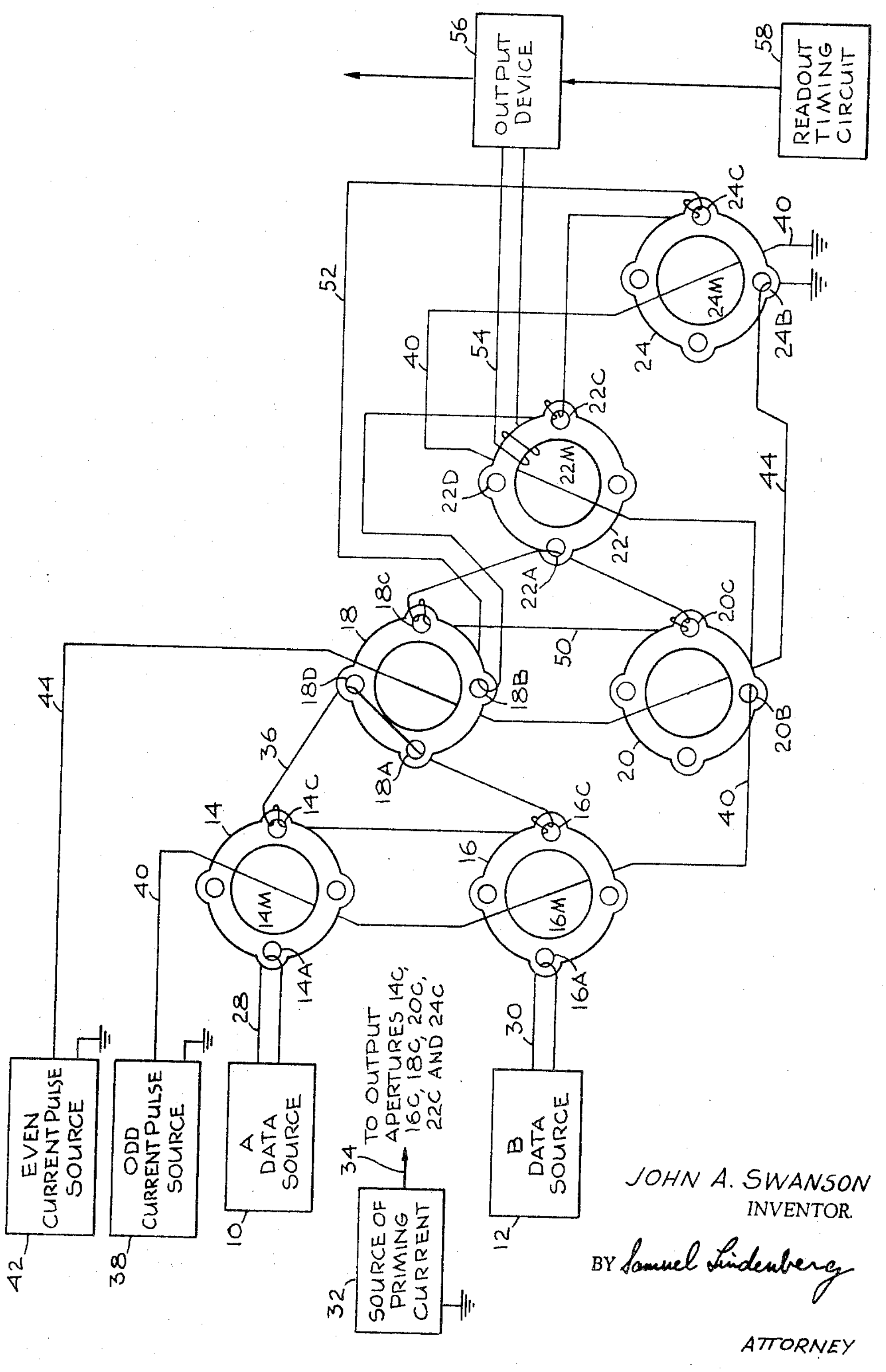
JOHN A. SWANSON
INVENTOR.
BY Samuel Lindenberg
ATTORNEY United States Patent Office 3,267,428
Patented August 16, 1966

3,267,428
MAGNETIC CORE COMPARATOR SYSTEM

John A. Swanson, Mountain View, Calif., assignor to AMP Incorporated, Harrisburg, Pa., a corporation of New Jersey Filed Dec. 14, 1962, Ser. No. 244,755
5 Claims. (Cl. 340—146.2)

This invention relates to comparator systems and more particularly to an improved magnetic core circuit for comparing data from two sources.

In the processing of data, such as is performed in computers, it is oftentimes necessary to compare data from two sources for the purpose of determining whether an identity exists. Such data usually exists in each source of data to be compared as a data word or number, being composed of a plurality of binary bits. There are two ways for comparing this data. One of these is to enter the data into two registers and to simultaneously compare the data in the two registers. Another arrangement is to circulate the data in the two registers and to compare the binary bits at some position, usually at the output position, of both registers. This requires that the comparator have some type of storage capability since at the end of the time required for comparing each one of the identically positioned bits in the two words or numbers being compared, there must be some storage capability to indicate whether or not the results of each bit comparison provided an identity or a lack of an identity.

The first arrangement for comparing for an identity, known as a parallel arrangement, requires as many comparators as there are binary bit positions being compared between the two registers. The second arrangement known as a serial arrangement, is a preferred one, because it requires only a single comparator. It is the arrangement which is used wherever the longer time required for its operation is of no consequence.

An object of this invention is to provide a novel, magnetic comparator circuit.

Yet another object of the invention is to provide a useful, magnetic comparator circuit which also provides a storage function.

Still another object of the present invention is the provision of an arrangement of magnetic core circuits to perform the logic of binary bit comparison and result storage.

Yet another object of the present invention is the provision of a unique magnetic core comparison system of the serial comparison type.

These and other objects of the invention may be achieved in an arrangement wherein a first group of magnetic cores to which binary bits from the two data sources are applied, perform the function of comparing these binary bits and produce a binary output indicative of the occurrence or not of an identity. This binary output is then applied to two inverter circuits connected in series with feedback between the first and second. The arrangement is such that, as long as the identity portion of the magnetic core circuits indicates an identity is occurring there is an output indicative of this fact derived from the second of the inverter circuits. Should the comparator circuit detect a lack of identity, then this alters the information being circulated by the inverters whereby such lact of identity having occurred is manifested. The indication of the occurrence of a lack of identity is maintained despite the occurrence of identities thereafter.

The novel features that are considered characteristic of this invention are set forth with particularity in the appended claims. The invention itself, both as to its organization and method of operation, as well as additional objects and advantages thereof, will best be understood from the following description when read in connection with the figure of the drawing which is a circuit diagram of an embodiment of the invention.

The embodiment of the invention which is to be explained herein, employs magnetic cores, preferably of the type known as multi-aperture ferrite cores. These ferrite cores are well known in the art. These cores usually have a somewhat toroidal shape with a central or main aperture and anywhere from two to four terminal apertures in the magnetic material surrounding the central aperture. The magnetic material is preferably a magnetic ferrite material which has a substantially rectangular hysteresis characteristic and two states of magnetic remanence. For the purpose of the description which follows, the cores will be said to have a clear state (representing ZERO) and a set state (representing a ONE). As is well known, a multi-aperture core can be driven to its set state by applying a current having the proper polarity to a winding which is wound on any one of the terminal apertures of the core. The magnetic core can be driven to its clear state by applying a current in the proper direction to a winding passing through the main aperture of the core. After a core has been driven to its set state, the core may be primed by applying a current to a winding which passes through one of the terminal apertures of the core, designated as its output aperture. A transfer of the state of remanence of one core to a succeeding core is achieved by coupling, by means of a transfer winding, the output aperture of the preceding core to one of the terminal apertures of a succeeding core, other than its output aperture. Then the preceding core which has been primed, is driven to its clear state, in order to effectuate such transfer.

Referring now to the drawing, there may be seen a circuit diagram of an embodiment of this invention. It is desired to compare the data which is stored in an "A" data source 10, with the data in a "B" data source 12. This data is provided from each of the sources in sequence, one binary bit at a time. In accordance with this invention there is employed for the purpose of comparison, a first, second and third magnetic core respectively 14, 16 and 18. For the purpose of storing the results of such comparison there are employed, fourth, fifth and sixth magnetic cores, respectively 20, 22, and 24. The "A" data source is coupled, by means of an input winding 28, to the input aperture 14A of the core 14. The "B" data source is coupled by an input winding 30 to the input aperture 16A of the core 16. Upon the occurrence of a ONE binary bit (or ZERO as desired) the "A" data source can drive the magnetic core 14 to its set state. Similarly, upon the output of a ONE binary bit the "B" data source 12 can drive the magnetic core 16 to its set state. A source of priming current 32, which preferably is a D.C. current source, has a priming winding 34, which is coupled inductively to every one of the cores 14 through 26 by passing through the output apertures respectively 14C through 24C. In order to preserve clarity in the drawing, the priming winding is not shown actually passing through each one of the output apertures, but is represented by an arrow having the designation "to every output aperture 14C through 24C." Since the manner of coupling the priming winding to the output apertures is well known in the art, it will be understood here that this is what is effectuated. Accordingly, it should be understood that whenever any one of the cores 14 through 26 is driven to its set state, it is then primed by reason of the application of a priming current to its output aperture.

A transfer winding 36 inductively couples the magnetic cores 14 and 16 to a succeeding magnetic core 18, by being wound through output apertures 14C and 16C and then passing through aperture 18A with one coupling sense and then back through aperture 18D with an opposite coupling sense. The sense of the coupling of the transfer winding 36 on the cores 14 and 16 is also relatively opposite.

An odd current pulse source 38 applies a current pulse to a clearing winding 40. The clear odd core winding passes through the main aperture 14M of core 14 and the main aperture 16M of core 16 being coupled to these cores with a sense such that current passing through the winding will drive these cores to their clear states. The winding 40 thereafter passes through an aperture 20B of the core 20 with a sense to drive this core to its set state when excited. The winding 40 thereafter, passes through the main aperture 22M of the core 22 for the purpose of driving the core to its clear state. Thereafter, the winding passes through the main aperture of the core 24 for the purpose of driving this core to its clear state when the winding has current thereon. An even current pulse source 42, applies pulses at alternate intervals to those applied to the clear odd winding to a clear even winding 44, for driving to their clear states cores 18 and 20 and for driving core 24 to its set state. Winding 44 is inductively coupled to the cores 18 and 20 by passing through their main apertures and is inductively coupled to core 24 by passing through its aperture 24B.

The windings on the cores 14, 16 and 18 are such that core 18 will be driven to its set state in response to the application of a clear drive to cores 14 and 16 if core 14 was in its set state and core 16 was in its clear state, or if core 16 was in its set state and core 14 was in its clear state. In other words, the arrangement performs the logical function $A\overline{B}+B\overline{A}=C$.

Assume initially that both the A and B data sources have produced outputs representative of binary ZERO's as a result of which cores 14 and 16 are both in their clear states. On the occurrence of an odd current pulse no output is induced in the transfer winding 36 since the odd current winding 40 applies a magnetomotive force to the cores 14 and 16 which drives them further in the state in which they already are. Thus, core 18 remains in its clear state.

Assume now that both the A data source and the B data source have driven cores 14 and 16 to their set states. These cores are then primed by the current from the source of priming current 32. Upon the occurrence of a current pulse on the clear odd winding 40, cores 14 and 16 are driven to their clear states. As a result, opposing voltages are induced in the transfer winding 36, resulting in a cancellation of these outputs. Accordingly, core 18 is left in its clear state.

Assume now that the core 14 has been driven to its set state by a binary ONE output from the A data source, and core 16 remains in its clear state. Upon the occurrence of a current pulse on the clear odd winding 40, core 14 is driven to its clear state whereby current flows in the winding 36 in a direction to drive the core 18 to its set state, using aperture 18D as the input aperture. Similarly, if core 16 were driven to its set state by an input from the B data source and core 14 remained in its clear state, upon the occurrence of a drive from the clear odd winding 40, core 16 would be driven back to its clear state and core 18 would be driven to its set state by the current flowing in the transfer winding 36, using aperture 18A as the input aperture. Thus, it can be seen that core 18 is driven to its set state by an output received from either core 16 or core 14. However, when both cores 14 and 16 have the identical states of remanence then core 18 remains in its clear state. Stated alternatively, core 18 remains in its cleared state in the presence of an identity of states between cores 14 and 16. Otherwise, core 18 is driven to its set state.

Assume now that core 18, as a result of a comparison of the states of cores 14 and 16, remains in its clear state. It was previously stated that winding 40, when energized, drives core 20 to its set state, using aperture 20B as the input aperture. A transfer winding 50 inductively couples cores 18 and 20 to core 22, being wound through output apertures 18C and 20C with a relatively opposite sense and then passing through input aperture 22A. Upon the application of a current pulse from the even current pulse source to the even current drive winding 44, cores 18 and 20 are driven to their clear states. Since only core 20 was driven to its set state (and then primed by the output from the priming current source 32) then an output is induced in the winding 50 only as a result of driving core 20 to its clear state. As a result, core 22 is driven to its set state by the coupling of winding 50 to the input aperture 22A.

Should core 18 have been driven to its set state, in response to a lack of identity between states, of the cores 14 and 16, then when winding 44 is energized by the even current pulse source 42, both cores 18 and 20 are driven to their cleared states in response to which voltages are induced in the winding 50 which oppose one another, cancel one another, and thereby leave core 22 in its clear state. Therefore, whenever core 18 is in a ONE state, core 22 remains in its ZERO state. Whenever core 18 is in a ZERO state, core 22 is driven to its ONE or set state of magnetic remanence. Thus, cores 18, 20, and 22 perform the operation of inverting the input to core 18.

Cores 22, 24, and 18 are coupled together by a transfer winding 52. This transfer winding 52 passes through the output aperture 22C and 24C of the respective cores with a relatively opposite coupling sense, and then couples to core 18 by passing through the input aperture 18B. Accordingly, should core 22 be in its clear state, then upon the energization of winding 40, a current will be induced in winding 52 by reason of the clear drive being applied to core 24. This current will drive core 18 to its set state, if not already there. Should cores 22 and 24 both be set (and then primed) then upon the occurrence of a current pulse on the winding 40, the net drive applied to core 18 will leave it in its clear state since the outputs of the cores 22 and 24 oppose one another in the winding 52 and therefore cancel.

To briefly review the operation of the system described, when the binary outputs from both A and B data sources are identical then upon energization of the clear odd winding 40, core 18 is left in its clear state. Core 20 is driven to its set state. Upon the energization of the clear even winding 44, core 22 is driven to its set state as is also core 24. Upon energization of the winding 40, cores 22 and 24 produce outputs which oppose one another and therefore the effect on core 18 from the winding 52 is to leave it in its clear state unless driven to its set state at this time by reason of an input to cores 14 and 16. This occurs, as previously pointed out, when there is a lack of identity.

Should core 18 have been driven to its set state by reason of the lack of identity in the remanent states of cores 14 and 16, produced by a lack of identity in the binary bits applied to their inputs, then because of the inverter action of cores 18 and 20 upon energization of winding 44, core 22 is driven from its set to its clear state. Upon energization of the winding 40 an output is induced in winding 52 from core 24 alone, whereby core 18 will be driven to its set state, if not already there. An output is derived from core 22 by means of an output winding 54 passing through the main aperture of that core. This output winding connects to an output device 56, which utilizes the information it receives.

From the operation that has been described it will be seen that as long as the input from the two data sources is identical, core 22 will be driven to its ONE representative state in response to even current pulse drives, and the output device 56 will receive an indication thereof every time the clear odd winding 40 is energized. Core 22 will be driven to and remain in its ZERO representative state whenever there is a lack of identity between the two inputs from the A and B data sources. Thus the output device 56 may be any indicating device which is timed to respond to an output from core 22, as by a readout timing circuit 58, upon the occurrence of the last odd current pulse drive in a comparing interval.

It will be apparent that the data sources may be magnetic core shift registers which receive advancing drives from the same even and odd current pulse sources 38 and 42 as drive the logical core arrangement shown. Effectively, this arrangement comprises an exclusive or gating system followed by two inverters with a feedback. The arrangement provides a memory in that, once a lack of identity has occurred, core 22 will always provide a ZERO binary signal output. As long as there is identity on the inputs, core 22 will provide a ONE binary signal output. At the end of a data word the arrangement may be cleared for the next comparison operation by either applying a clear drive to all the cores simultaneously by a single clear winding (not shown) or by opening up the winding 34 during the occurrence of a current pulse applied to the clear odd core winding 40.

There has been accordingly shown and described herein above, a novel, useful, simple arrangement of magnetic cores which perform the operation of a comparison for identity and storage during the interval of said comparison to indicate the results thereof.

I claim:

1. Apparatus for comparing for identity the data received sequentially from two binary data sources comprising a first and second magnetic core each having a zero representative state of magnetic remanence and a one representative state of magnetic remanence, comparing means to which outputs from said two binary data sources are applied for driving said first magnetic core to its one state of remanence when said comparing means has two dissimilar data inputs applied thereto, first means for applying a drive to said first magnetic core to drive it to its zero state of magnetic remanence, means responsive to said first magnetic core being in its one state of remanence when driven by said first means, for driving said second magnetic core to its zero state of magnetic remanence and to said first magnetic core being in its zero state of remanence when driven by said first means, for driving said second magnetic core to its one state of remanence, second means for applying a drive to said second magnetic core alternatively with said first means to drive it to its zero state of remanence, and means responsive to said second magnetic core being in its zero state when driven by said second means, for driving said first core to its one state and to said second magnetic core being in its one state for driving said first core to its zero state, and means for maintaining the state of remanence of said second core indicative of whether or not identity has occurred and for maintaining said second core in its zero state of remanence once said first core has been driven to its one state of magnetic remanence.

2. Apparatus for comparing for identity the data received sequentially from two binary data sources comprising first and second, third and fourth magnetic means each having a one representative magnetic state of remanence and a zero representative state of magnetic remanence, means coupling said first magnetic means to one of said two binary data sources to be driven to its one or zero state of magnetic remanence in response to an output from said one binary data source, means coupling said second magnetic means to the other of said two binary data sources to be driven to its one or zero state of magnetic remanence in response to output from said other binary data source, means coupling said first and second magnetic means to said third magnetic means for driving said third magnetic means to its one representative state of magnetic remanence only when said first and second magnetic means have been driven to dissimilar states of remanence by said first and second data sources, means coupling said third and fourth magnetic means for driving said fourth magnetic means to a state of magnetic remanence which represents a binary digit opposite to the one represented by said third magnetic means, and means coupling said fourth magnetic means to said third magnetic means for driving said third magnetic means to a state of remanence which represents a binary digit opposite to the one represented by said fourth magnetic means, and means for maintaining the state of remanence of said fourth magnetic means indicative of whether or not there is an identity of the data received from said two binary data sources, and means for maintaining said fourth magnetic means in its zero state of remanence once said third magnetic means has been driven to its one state of magnetic remanence.

3. Apparatus as recited in claim 2 wherein said means coupling said third and fourth magnetic means for driving said fourth magnetic means to a state of magnetic remanence which represents a binary digit opposite to the one represented by said third magnetic means includes a fifth magnetic means having a one and a zero state of magnetic remanence, means for establishing said fifth magnetic means in its one state of magnetic remanence, and means for coupling said third and fifth magnetic means to said fourth magnetic means for driving said fourth magnetic means to its one state of magnetic remanence only when said third and fifth magnetic means are in their respective zero and one states of magnetic remanence.

4. Apparatus as recited in claim 2 wherein said means coupling said fourth magnetic means to said third magnetic means for driving said third magnetic means to a state of remanence which represents a binary digit opposite to the one represented by said fourth magnetic means includes a sixth magnetic means having a one and a zero state of magnetic remanence, means for establishing said sixth magnetic means in its one state of magnetic remanence, and means for coupling said fourth and sixth magnetic means to said third magnetic means for driving said third magnetic means to its one state of magnetic remanence only when said fourth and sixth magnetic means are in their respective zero and one states of magnetic remanence.

5. Apparatus for comparing the data received sequentially from two binary data sources comprising first, second, third, fourth, fifth and sixth magnetic cores of the type having a one representative magnetic state of remanence and a zero representative state of magnetic remanence, means coupling said first magnetic core to one of said two binary data sources to be driven to its one or zero state of magnetic remanence in response to an output therefrom, means coupling said second magnetic core to the other of said two binary data sources to be driven to its one or zero state of magnetic remanence in response to an output therefrom, a first output winding coupling said first and second cores to said third core, said first output winding being wound on said first and second core with a sense for opposing similar outputs from said first and second cores and for driving said third core to its one state of remanence in response to dissimilar outputs from said first and second magnetic core, a second output winding coupling said third and fifth magnetic core to said fourth magnetic core, said second output winding being wound on said third and fifth cores with a sense for opposing similar outputs from said first and second magnetic cores and for driving said fourth core to its one state of remanence in response to dissimilar outputs from said third and fifth magnetic cores, a third output winding coupling said fourth and sixth cores to said third core, said third output winding being wound on said fourth and sixth cores with a sense for opposing similar outputs from said fourth and sixth cores and for driving said third core to its one state in response to dissimilar outputs from said fourth and sixth cores, a first drive means for simultaneously driving said first, second, fourth and sixth cores to their zero states of remanence and said fifth core to its one state of remanence, and a second drive means operative alternately to said first drive means for simultaneously driving said third, and fifth cores to their zero states of remanence and said sixth core to its one state of magnetic remanence whereby the state of remanence of said fourth core represents whether or not identity of data in said first and second sources has occurred.

References Cited by the Examiner

UNITED STATES PATENTS

| | | | |
|---|---|---|---|
| 2,995,731 | 8/1961 | Sweeney | 340—174 |
| 3,159,813 | 12/1964 | Dowling | 340—146.2 |

MALCOLM A. MORRISON, *Primary Examiner.*

ROBERT C. BAILEY, *Examiner.*

M. J. SPIVAK, *Assistant Examiner.*